April 1, 1930.  C. S. DERNBACH  1,753,111
DEVICE FOR DEPICTING RURAL SCENES
Filed Dec. 30, 1927   3 Sheets-Sheet 2

INVENTOR.
C. S. Dernbach,
BY
Geo. F. Kimmel
ATTORNEY.

April 1, 1930.  C. S. DERNBACH  1,753,111
DEVICE FOR DEPICTING RURAL SCENES
Filed Dec. 30, 1927  3 Sheets-Sheet 3
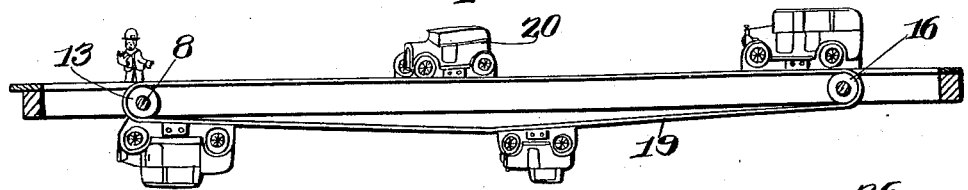
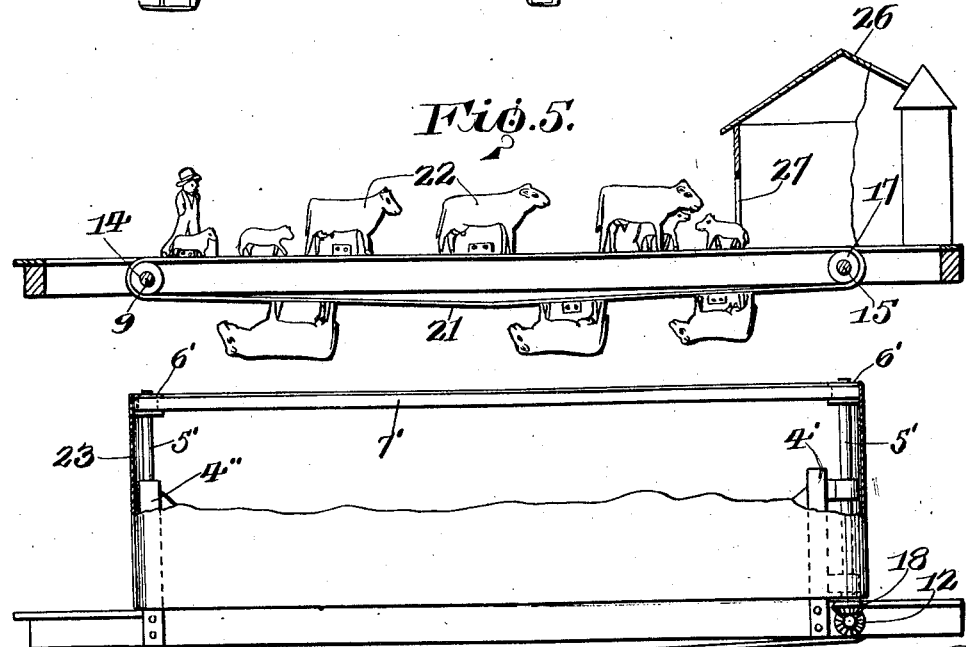
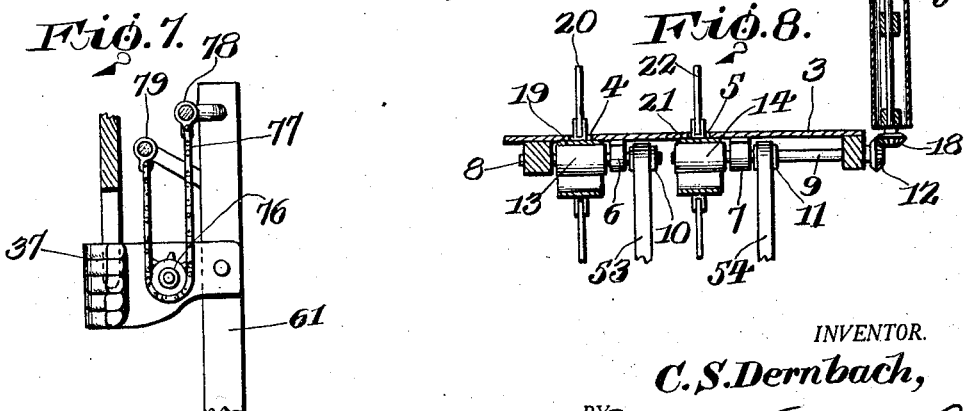
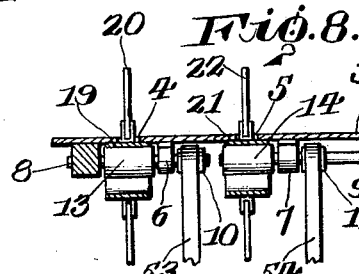
INVENTOR.
C. S. Dernbach,
BY Geo. P. Kimmel
ATTORNEY.

Patented Apr. 1, 1930

1,753,111

UNITED STATES PATENT OFFICE

CHARLES S. DERNBACH, OF WAUSAU, WISCONSIN

DEVICE FOR DEPICTING RURAL SCENES

Application filed December 30, 1927. Serial No. 243,623.

This invention relates to a device for depicting rural scenes and has for its object to provide, in a manner as hereinafter set forth, a device of such class for successively displaying advertisements and further including means operating in conjunction with the displayed advertisements for depicting rural scenes for directing attention to the displayed matter.

A further object of the invention is to provide, in a manner as hereinafter set forth, a device of the class referred to including means to simulate the figures of animals, fowls and people moving in a life-like and realistic manner and operating in conjunction with displayed advertising matter for directing attention to the latter.

A further object of the invention is to provide, in a manner as hereinafter set forth, a device of the type referred to including means to simulate the figures of animals, fowls and people moving in a life-like and realistic manner, with representations of vehicles moving simultaneously with said figures and further including means for displaying advertising matter and with the figures and representations of the vehicles operating in conjunction with said means for directing attention to the displayed advertising matter.

Further objects of the invention are to provide, in a manner as hereinafter set forth, a device for depicting rural scenes which is simple in its construction and arrangement, strong, durable, thoroughly efficient in its use, attractive in appearance, readily assembled, and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 4 is an elevation of the carrier or conveyor to which are attached the representations of motor vehicles.

Figure 5 is an elevation of the carrier or conveyor to which are attached the figures simulating animals.

Figure 6 is an elevation of the carrier or conveyor to which is attached the card or other means for displaying advertising matter.

Figure 7 is a fragmentary view in section illustrating the operating means for the representation of a pair of hands employed to simulate the appearance of milking a cow.

Figure 8 is a fragmentary view in section illustrating the operating means for the several carriers.

Figure 1:
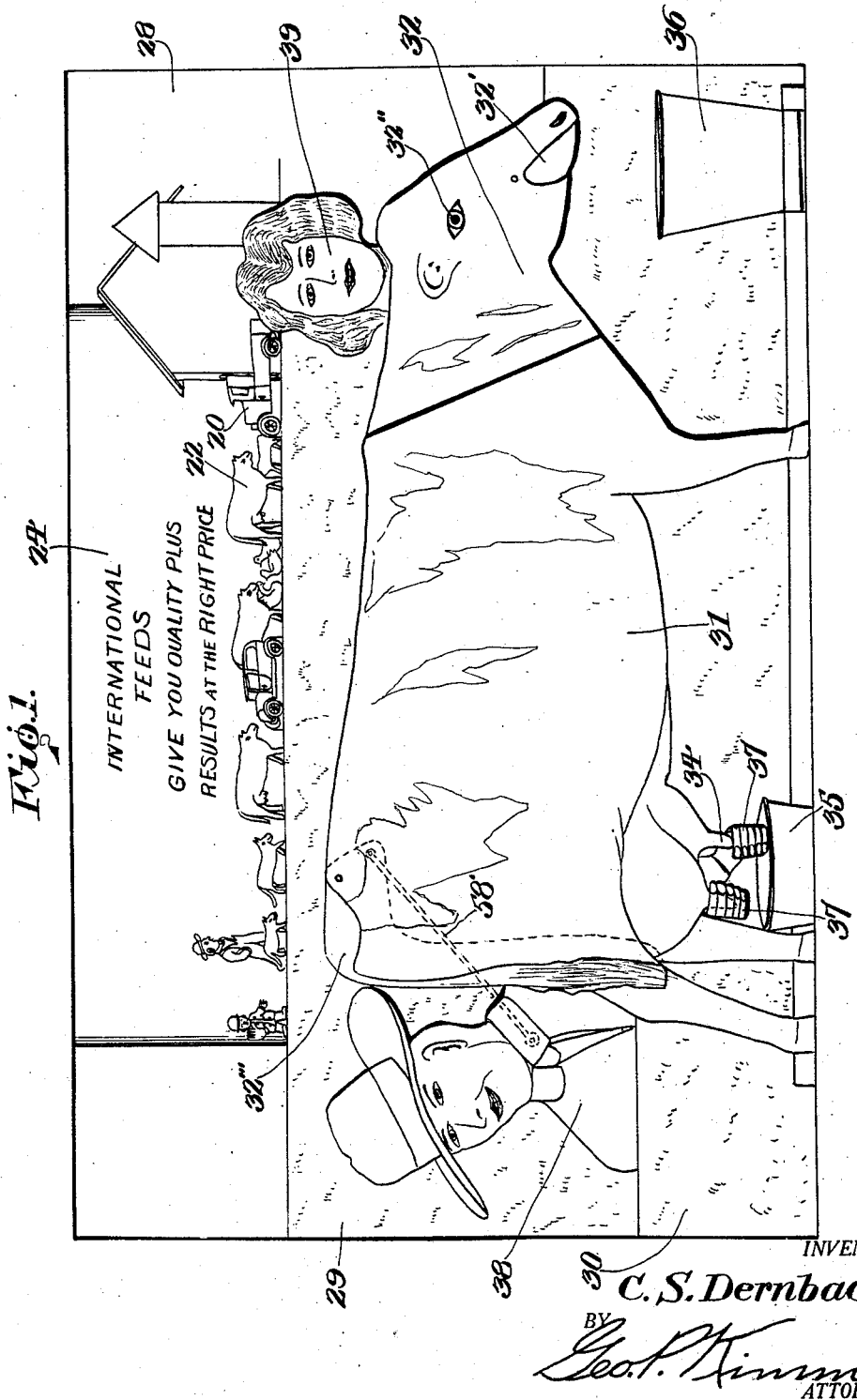
Figure 1 is a front elevation of a device for depicting rural scenes in accordance with this invention.
Figure 2:
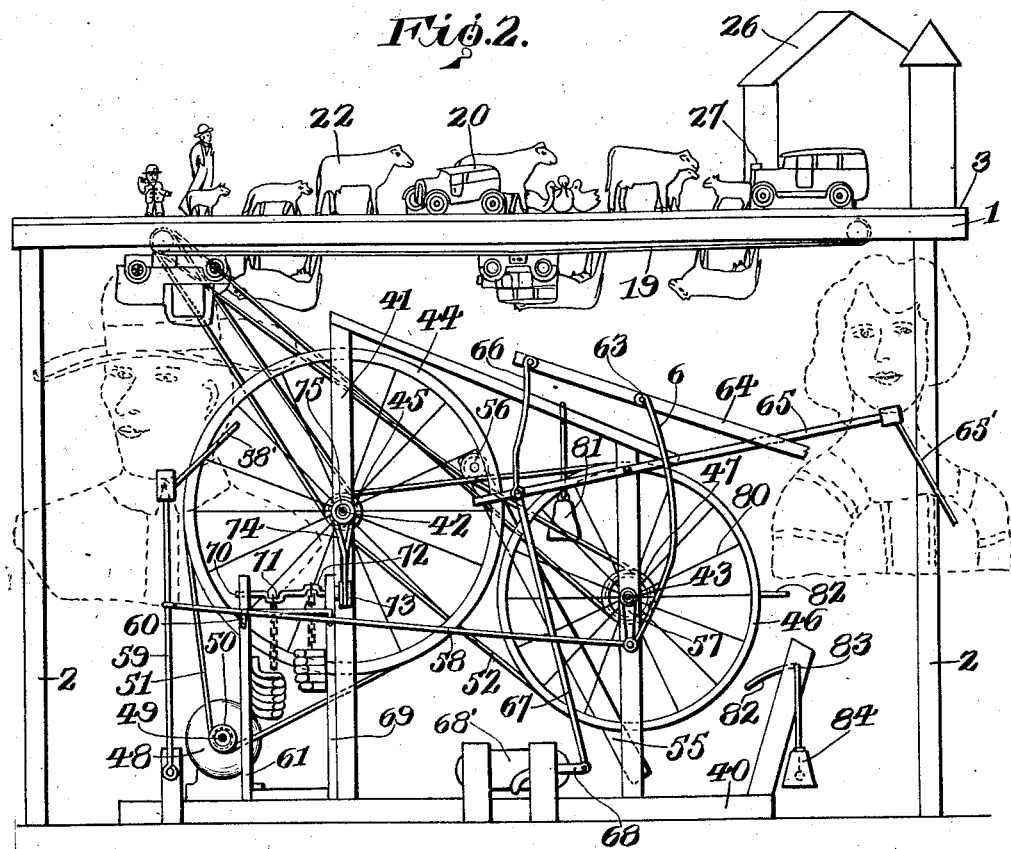
Figure 2 is a rear elevation thereof.
Figure 3:
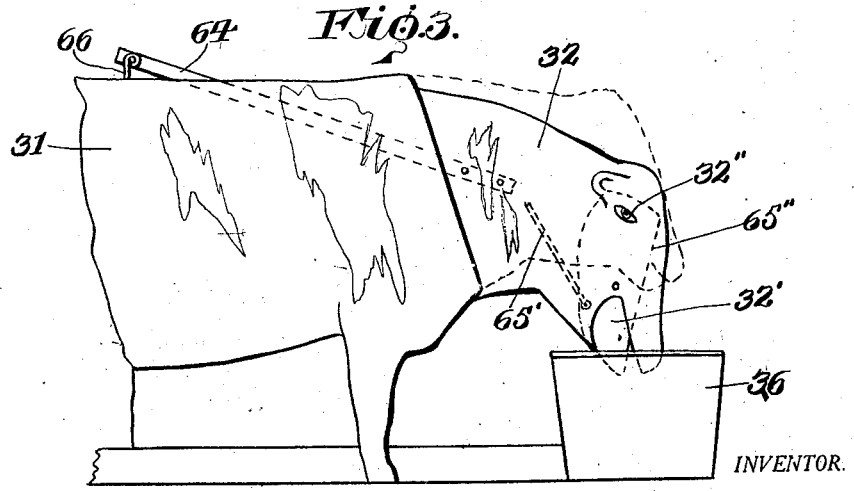
Figure 3 is a fragmentary view in front elevation of a figure simulating the appearance of a cow having a shiftable neck and further illustrating the neck in dotted lines in normal position and in full lines in shifted position simulating the appearance of the cow eating.

Referring to the drawings in detail 1 denotes a rectangular frame supported by uprights 2. Mounted upon the frame 1, as well as being suitably secured therewith is a platform 3 corresponding in contour to the shape of the frame 1. The platform 3 is formed with a pair of lengthwise extending spaced slots 4, 5 for a purpose to be presently referred to. The platform 3 preferably is of greater length and width than the length and width of the frame 1. Secured to and depending from the lower face of the platform 3, in proximity to one end thereof, is a pair of spaced, aligning hangers 6, 7. Journaled in one of the side bars of the frame 1 and the hanger 6 is a shaft 8 and journaled in the other side bar of the frame 1 and hanger 7 is a shaft 9. The shaft 8 carries a pulley 10 and the shaft 9 a pulley 11. The shaft 9 projects from the frame 1 rearwardly thereof, and its projecting end is provided with a bevel pinion 12. The pulley 10 on the shaft 8 is arranged on said shaft adjacent the hanger 6 and carried by the shaft 8 and interposed between the hanger 6 and that side bar of the frame 1 in which is journaled said shaft 8 is a pulley 13. The shaft 9 projects from the hanger 7 and on said projecting end is provided with a pulley 14. The pulleys 10 and 11 are driven from a means to be presently referred to, for the purpose of operating the shafts 8 and 9. The pulleys 13 and 14 are of greater length than the pulleys 10 and 11. Journaled in the side bars of the frame 1 in proximity to the other end thereof is a shaft 15 which extends rearwardly from the rear side bar of said frame 1. The shaft 15 is provided with pulleys 16 and 17. The pulley 16 is arranged to oppose the pulley 13. The pulley 17 is arranged to oppose the pulley 14. Travelling over the pulleys 13 and 16 is a carrier in the form of an endless conveyor 19 carrying spaced, representations of motor vehicles as indicated at 20, and which travel through the slot 4 and are disposed vertically. Travelling over the pulleys 14 and 17 is a carrier 21 in the form of an endless conveyor carrying spaced figures to simulate animals and people as indicated at 22 and which travel through the slot 5 and are disposed vertically. Secured to the platform 3 are vertically disposed, spaced supporting brackets 4′, 4″ for upstanding shafts 5′, 5″ provided at their upper ends with pulleys 6′ for operating an endless belt 7′ to which is secured a carrier 23 in the form of an endless conveyor. The lower end of the shaft 5′ is provided with a bevel pinion 18 which meshes with and is driven from the pinion 12. The carrier 23 is provided with advertising matter and travels rearwardly of the platform 3 and is disposed vertically. The carriers 21 and 23 are operated from the shaft 9 and travel at the same rate of speed. The carrier 19 is operated from the shaft 8 and travels at a greater rate of speed than that of the carriers 21 and 23.

Secured upon the platform 3 is a structure 26 simulating the appearance of a barn and provided in one of its walls with an opening 27 for the entrance into the barn of the figures 22. The figures 20 travel exteriorly of the structure 26 and the cards 24 travel rearwardly of the structure 26. Positioned at the rear of the frame 1 and spaced from the cards 24 is a panel or wall forming member 28 of a height to extend a substantial distance above the platform 1. The panel 28 can be decorated in any suitable manner or provided with advertising matter. Arranged at the front of the platform 3 and depending therefrom is a panel or screen 29 painted in any suitable manner, preferably to represent a field. Positioned forwardly of the panel or screen 29, and of less height than the height of the latter, is a panel or screen 30 painted to represent a field. Arranged forwardly of the panel or screen 30 is a figure 31 which simulates the appearance of a cow and which is formed with a shiftable neck 32 and a shiftable lower jaw 32′, a shiftable eye 32″ and a shiftable tail 32‴. The screen or panel 30 is formed with an opening 33 for a purpose to be presently referred to. The figure 31 is provided with teats 34 arranged over the representation of a bucket or pail 35. Positioned below the head of the figure 31 is the representation of a bucket or pail 36. Surrounding the representation of the teats 34 is a pair of shiftable members 37, 38 simulating the appearance of a pair of hands extended from the figure 38 simulating the appearance of the upper portions of a person. The figure 38 is positioned between the panels 29 and 30. Arranged rearwardly of the neck 32 of figure 31 is a figure 39 simulating the head and neck of a female.

Arranged rearwardly of the panel 29 and below the frame 1 is a base member 40 carrying a supporting frame 41. Journaled in the frame 41 at one end thereof and below its top is a shaft 42 and journaled in the other end of the frame 41 and below its top, and also below the shaft 42, is a shaft 43. The shaft 42 carries a large pulley wheel 44 and a small pulley 45. The shaft 43 carries a large pulley wheel 46, and a small pulley 47. The pulley 46 is of less diameter than the pulley 44, but of greater diameter than the pulley 42. The pulley 47 is of greater diameter than the pulley 42. Mounted on the base member 40 is a motor 48, having its shaft 49 provided with a grooved pulley 50.

The pulleys 44 and 46 are peripherally grooved and extending from the pulley 44 to the pulley 49 is a driving belt 51 therefor. Extending from the pulley 45 to the pulley 46 is a driving belt 52 therefor. Extending from the pulley 47 to the pulley 10 is a driving belt 53 for the shaft 8. The driving belt 53 is torsionally twisted to provide for the operation of the shaft in a direction to cause the representations of the motor vehicles to travel away from the structure 26. Extending from the pulley 45 to the pulley 11 is a driving belt 54 for the shaft 9 and which operates said shaft in a manner to cause the travel of the figures 22 and cards 24 towards the structure 26. Secured to the frame 41 is an upstanding, inclined support 55 carrying at its upper end a guide pulley 56 for the belt 53 and the latter rides against the bottom of the pulley 56.

The shaft 43 has a crank arm 57, to which is connected an actuating rod 58, for a vertically extending, oscillatory rod 59 attached to the figure 38 for shifting the latter in a manner to be positioned rearwardly of the figure 31 and also in an opposite direction for the purpose of exposing the figure 38. The rod 58 is pivotally supported intermediate its ends, as at 60 upon an upright 61 and is provided with a pivoted link 58′ for shifting the tail 38'''. Connected to the crank arm 57 is an upstanding, curved actuating bar 62, which is pivotally connected at its upper end as at 63, to an operating rod 64 which is attached to the neck 32 for the purpose of elevating and lowering the same and when the neck 32 is lowered it will simulate the appearance of the head of the cow in eating position with respect to the bucket or pail 36. The bar 62 is connected to the rod 64 intermediate the ends thereof. Pivotally connected, intermediate its ends, to the frame 41 is an operating bar 65 for the figure 39, and which provides means for elevating and lowering such figure. Attached to the bar 65 is a pivoted link 65' for shifting the jaw 31' and eye 32' which are provided by plate 65'' pivotally connected to the head 32. The rods 64 and 65 are connected together at their inner ends by a link 66, and the rods 65 has connected therewith an actuating bar 67, attached to a pivoted arm 18 for the purpose of operating a register 68' to record the number of times the head 32 has been lowered. Opposing the upright 61 is an upright 69 and journaled in said upright, in proximity to the upper ends thereof, is a shaft 70 provided with a pair of cranks 71, 72. The shaft 70 carries a pulley 73 operated by a belt drive 74, which extends from a pulley 75 carried by the shaft 42. One of the members 37 is pivotally connected to the upright 61 and the other of the members 37 is pivotally connected to the upright 69. With reference to Figure 7 each element 37 carries a revoluble sprocket pinion 76 over which travels a sprocket chain 77. One end of the sprocket chain 77 is anchored as at 78 and its other end is carried by a crank 71 or 72 as at 79. The cranks 71, 72 are oppositely disposed with respect to each other whereby the elements 37 will be shifted on their pivots in opposite directions with respect to each other, that is to say when one element 37 moves down the other element will move up.

The pulley 46 is in the form of a wheel and its spokes 80 are employed for actuating a bell 81 which is suspended from the supporting frame 41. The bell 81 is arranged in the path of the spokes 80. The pulley wheel 46 is furthermore provided with a radially disposed arm 82 at its peripheral edge, adapted to intermittently engage a crank arm, carried by a shaft 83, from which is suspended a cow bell 84, and when the arm 82 trips the shaft 83 the cow bell 84 will be sounded. The sounding of the cow bell is had intermittently.

The operating mechanism is constructed and arranged for simultaneously operating the carriers, bell 81, elements 37, 38, 93, 32, 32', 32'' and 32'''. The operation of figures 38, 39, travel of the elements 20, 22 and operation of elements 32, 32', 32'', 32''' and 37 will attract attention thereto and also to the advertisements on one of the carriers, therefore it is thought the many advantages of an advertising device, in accordance with this invention, can be readily understood, and although the preferred embodiment of the invention is as illustrated and described, yet it is to be understood that changes in the details of construction can be had which fall within the scope of the invention as claimed.

What I claim is:—

1. In a device for depicting rural scenes a pair of sidewise opposed, travelling endless carriers, one provided with means to represent spaced vehicles and the other provided with means to stimulate live stock and a person, a travelling endless carrier disposed at right angles with respect to the other of said carriers and provided with advertising matter, driving connections for the first mentioned carriers, means operated from one of said driving connections for operating that carrier disposed at right angles, and one of said driving connections for the pair of carriers driving its respective carrier in an opposite direction with respect to the carrier of the other pair, and a common operating means for simultaneously operating said driving connections.

2. In a device for depicting rural scenes a pair of sidewise opposed, endless carriers, one provided with means to simulate live stock and a person and the other provided with means to represent spaced vehicles, a driving connection for one of said carriers, a driving connection for the other of said carriers and driving the latter in an opposite direction with respect to the direction of the first carrier, a travelling endless carrier provided with advertising matter, means for operating said last mentioned carrier on one of the driving connections for one or the other of the carriers, and a common operating means for said driving connections to provide for the simultaneous operation of said carriers.

3. A device for the purpose set forth comprising means for depicting rural scenes including a stationary portion simulating a barn, a pair of travelling portions, one having upstanding simulations of live stock, fowls and human beings and the other simulations of vehicles, said means further including upstanding, spaced, opposed panels for simulating a meadow, stationary and movable parts simulating a cow in a meadow in the act of drinking and being milked, said parts and panels arranged forwardly and below said portions, and means for simultaneously operating said travelling portions and movable parts.

4. A device for the purpose set forth comprising means for depicting rural scenes including upstanding, spaced, opposed panels for simulating a meadow a stationary portion simulating a barn, a pair of travelling portions, one having upstanding simulations of live stock, fowls and human beings and the other simulations of vehicles, said means further including stationary and movable parts simulating a cow in a meadow in the act of drinking and being milked, said parts and panels arranged forwardly and below said portions, and means for simultaneously operating said travelling portions and movable parts, that travelling portion having the simulations of live stock arranged to depict the latter as entering the barn, and said other travelling portion arranged to depict the simulations of the vehicles carried thereby as travelling exteriorly of the barn.

5. A device for the purpose set forth comprising means for depicting rural scenes including upstanding, spaced, opposed panels for simulating a meadow a stationary portion simulating a barn, a pair of travelling portions, one having upstanding simulations of live stock, fowls and human beings and the other simulations of vehicles, said means further including stationary and movable parts simulating a cow in a meadow in the act of drinking and being milked, said parts and panels arranged forwardly and below said portions, means for simultaneously operating said travelling portions and movable parts, that travelling portion having the simulations of live stock arranged to depict the latter as entering the barn, said other travelling portion arranged to depict the simulations of the vehicles carried thereby as travelling exteriorly of the barn, and said operating means arranged to operate said travelling portions in opposite directions.

6. A device for the purpose set forth comprising means for depicting rural scenes including simulations of a meadow, barn, live stock, fowls, human beings and vehicles, said live stock including a cow formed of stationary and movable parts arranged forwardly of the meadow simulation, said movable parts being arranged to depict the simulation of a cow in a meadow in the act of drinking and being milked, and operating said movable parts and further including means for the simultaneous travel of the simulations of the fowls, human beings, vehicles and the live stock other than said cow simultaneously with the operation of said movable parts.

7. A device for the purpose set forth comprising means for depicting rural scenes including simulations of a meadow, barn, live stock, fowls, human beings and vehicles, said live stock including a cow formed of stationary and movable parts arranged forwardly of the meadow simulation, said movable parts being arranged to depict the simulation of a cow in a meadow in the act of drinking and being milked, and operating said movable parts and further including means for the simultaneous travel of the simulations of the fowls, human beings, vehicles and the live stock other than said cow simultaneously with the operation of said movable parts, said driving mechanism being so arranged to provide for the travel of the simulations of the vehicles in a direction opposite to the direction of travel of the other travelling simulations.

In testimony whereof, I affix my signature hereto.

CHARLES S. DERNBACH.